(12) United States Patent
Kuhn

(10) Patent No.: US 7,158,914 B2
(45) Date of Patent: Jan. 2, 2007

(54) PRECISION SURFACE MEASUREMENT

(75) Inventor: William P. Kuhn, Tucson, AZ (US)

(73) Assignee: Zygo Corporation, Middlefield, CT (US)

( * ) Notice: Subject to any disclaimer, the term of this patent is extended or adjusted under 35 U.S.C. 154(b) by 62 days.

(21) Appl. No.: 11/052,608

(22) Filed: Feb. 7, 2005

(65) Prior Publication Data

US 2005/0177339 A1   Aug. 11, 2005

Related U.S. Application Data

(60) Provisional application No. 60/542,792, filed on Feb. 6, 2004.

(51) Int. Cl.
*G01B 3/22* (2006.01)
(52) U.S. Cl. ...................................... 702/155
(58) Field of Classification Search ................ 702/155, 702/94, 150, 151, 156, 157; 700/303
See application file for complete search history.

(56) References Cited

U.S. PATENT DOCUMENTS

| 4,594,003 | A | 6/1986 | Sommargren |
| 5,982,490 | A | 11/1999 | Ichikawa et al. |
| 2003/0160968 | A1 | 8/2003 | Deck |
| 2005/0083537 | A1* | 4/2005 | Kuchel ........................ 356/513 |

OTHER PUBLICATIONS

Retrieved from the Internet Aug. 17, 2006: <http://www.phys.ufl.edu/~coldwell/class2K/Fourier/OZeqn.htm>, The two body correlation function, The Ornstein Zernike equation, p. 1-5.*

Retrieved from the Internet Aug. 17, 2006: <http://electronics-cooling.com/html/2003_february_a1.html>, Optical Measurement of Flip-chip Package Warpage and its Effect on Thermal Interfaces, and Far Infrared Fizeau Interferometry, p. 1-10.*

Dörband, Bernd and Günther Seitz, "Interferometric testing of optical surfaces at its current limit", Optik 112, No. 9 (2001), pp. 392-398.

Elster, Clemens, "Exact two-dimensional wave-front reconstruction from lateral shearing interferograms with large shears," Appl Opt, V39, No. 29, Oct. 10, 2000, pp. 5353-5359.

Evans, Chris J. and Kestner, Robert N. "Test Optics Error Removal" Applied Optics, 1996, vol. 35, No. 7, 1015-21.

Fritz, Bernard S. "Absolute Calibration of an Optical Flat" Optical Engineering, 1984, vol. 23, No. 4, 379-83.

(Continued)

*Primary Examiner*—Michael Nghiem
*Assistant Examiner*—Tung S. Lau
(74) *Attorney, Agent, or Firm*—Fish & Richardson P.C.

(57) ABSTRACT

A test surface of a test object is measured with respect to a reference surface to generate a first relative surface measurement, where the test surface is in a first position relative to the reference surface. The test surface is measured with respect to the reference surface to generate a second relative surface measurement, where the test surface is in a second position relative to the reference surface different from the first position. Estimates of a rotationally varying part of a measurement of the test surface and a rotationally varying part of a measurement of the reference surface are provided. An estimate of a rotationally invariant part of the measurement of the test surface is calculated at a plurality of radial values based on a combination of the relative surface measurements, the provided estimates, and a difference between the first and second relative positions.

35 Claims, 3 Drawing Sheets

OTHER PUBLICATIONS

"Numerical Recipes in C++", 2nd. edition, 2002, pp. 62-73.
Küchel, Michael "A new approach to solve the three flat problem" Optik 112, No. 9 (2001) pp. 381-391.
Sonozaki et al "Measurement of profiles along a circle on two flat surfaces by use of a Fizeau interferometer with no standard" Applied Optics, vol. 42, No. 34 (2003) pp. 6853-6858.
Bourgeois, Robert P., Joann Magner, and H. Philip Stahl, "Results of the Calibration of Interferometer Transmission Flats for the LIGO Pathfinder Optics", SPIE vol. 3134, pp. 86-94, 1997.
Küchel, Michael—"How to measure flat optical surface with high accuracy," description of presentation given at conference "Centro de Investigaciones en Optica, A.C." in León, Mexico, Jun. 15, 2000.

* cited by examiner

PRECISION SURFACE MEASUREMENT

CROSS-REFERENCE TO RELATED APPLICATIONS

This application claims priority to U.S. Provisional Application Ser. No. 60/542,792, filed on Feb. 6, 2004, entitled "METHOD FOR SEPARATING ROTATIONALLY INVARIANT ERRORS IN A PART FROM THOSE IN A MEASUREMENT INSTRUMENT," incorporated herein by reference.

BACKGROUND

The invention relates to precision surface measurement, including techniques to measure surface characteristics of precision optical components unbiased by a measurement system.

The need to determine the errors in a part (e.g., an optical component, such as a lens or mirror), unbiased by errors in a measurement system, is a long-standing problem. One general approach is to measure multiple objects in different combinations and then to determine the contributions from each object individually, such as in the 3-Flat test. The 3-Flat test has a variety of limitations; one of the most significant is the need for three, nominally identical parts to test.

The second general approach is to perform a measurement of the surface of a "test part" in a measurement system, and then to displace or "shear" the test part relative to the measurement system. Differencing the two measurements cancels the contribution (bias) of the measurement system and leaves one with an approximation of the derivative of the surface in the same direction as the shear motion. An estimate of the surface of the part under test unbiased by the measurement system error may be derived from the difference data.

Within the family of shearing methods, there are two general approaches that have been used: lateral shear and rotational shear. Lateral shear in two orthogonal directions results in an estimate of the gradient of the part under test; however, the use of lateral shear alone can be sensitive to drift resulting in errors proportional to the array size in the estimate of the test part. Rotational shearing methods have been widely reported and have been shown to be robust for the determination of the rotationally varying surface errors; however, rotational shearing methods alone do not typically allow one to determine the rotationally invariant errors (e.g., mean radial profile) of the test part and instrument separately from one another.

SUMMARY

Among other aspects, the invention features precision surface measurement techniques including the precision measurement of optical surface figure error, and deals in particular with the need to separate the errors present in a measurement system from errors in the part under test. For example, the techniques are applicable to any surface shape measurement technology where the errors in the measurement device are significant compared to the errors in the part under test. One example of a surface shape measurement technology is surface profiling interferometry. Accordingly, the techniques described herein may be applied to data acquired with surface profiling interferometers, including commercially-available interferometry systems, such as the NewView 5000 available from Zygo (Middlefield, Conn.), and to data acquired with surface form or wavefront measuring interferometry systems, such as the GPI family of products available from Zygo (Middlefield, Conn.). The techniques described herein may also be applied to data acquired with other surface shape measurement technologies including non-interferometric technologies including, for example, data acquired with a coordinate measuring machine (CMM) such as the PRISMO family of products available from Carl Zeiss, Inc, or data acquired with a stylus profilometer.

In part, the invention is based on the realization that a rotationally invariant part of a test surface measurement (e.g., the mean radial profile), unbiased by the errors in a reference surface, can be obtained based on estimates of the rotationally varying parts of measurements of the test and reference surfaces and at least two surface measurements in which the test and reference surfaces are laterally displaced (sheared) by a known amount between the two measurements.

We now summarize various aspects and features of the invention.

In one aspect, in general, the invention features a method that includes measuring a test surface of a test object with respect to a reference surface to generate a first relative surface measurement, where the test surface is in a first position relative to the reference surface. The test surface is measured with respect to the reference surface to generate a second relative surface measurement, where the test surface is in a second position relative to the reference surface different from the first position. Estimates of a rotationally varying part of a measurement of the test surface and a rotationally varying part of a measurement of the reference surface are provided. An estimate of a rotationally invariant part of the measurement of the test surface is calculated at a plurality of radial values based on a combination of the first relative surface measurement, the second relative surface measurement, the estimate of the rotationally varying part of the measurement of the test surface, the estimate of the rotationally varying part of the measurement of the reference surface, and a difference between the first and second relative positions.

In another aspect, in general, the invention features a computer readable medium including a program that causes a processor to receive a first relative surface measurement of a test surface of a test object with respect to a reference surface, where the test surface is in a first position relative to the reference surface. The processor receives a second relative surface measurement of the test surface with respect to the reference surface, where the test surface is in a second position relative to the reference surface different from the first position. The processor receives estimates of a rotationally varying part of a measurement of the test surface and a rotationally varying part of a measurement of the reference surface. The processor calculates an estimate of a rotationally invariant part of the measurement of the test surface at a plurality of radial values based on a combination of the first relative surface measurement, the second relative surface measurement, the estimate of the rotationally varying part of the measurement of the test surface, the estimate of the rotationally varying part of the measurement of the reference surface, and a difference between the first and second relative positions.

In another aspect, in general, the invention features an apparatus including an interferometer configured to measure a test surface of a test object with respect to a reference surface to generate a first relative surface measurement, where the interferometer includes a stage to position the test surface is in a first position relative to the reference surface.

The interferometer is configured to measure the test surface with respect to the reference surface to generate a second relative surface measurement in which the stage is configured to position the test surface in a second position relative to the reference surface different from the first position. The apparatus includes an electronic processor configured to receive the first relative surface measurement and the second relative surface measurement; receive estimates of a rotationally varying part of a measurement of the test surface and a rotationally varying part of a measurement of the reference surface; and calculate an estimate of a rotationally invariant part of the measurement of the test surface at a plurality of radial values based on a combination of the first relative surface measurement, the second relative surface measurement, the estimate of the rotationally varying part of the measurement of the test surface, the estimate of the rotationally varying part of the measurement of the reference surface, and a difference between the first and second relative positions.

Implementations of the invention may include one or more of the features.

The second position includes a laterally displaced position with respect to the reference surface.

The second position of the test surface relative to the reference surface is achieved by moving the test surface and keeping the reference surface fixed.

The second position of the test surface relative to the reference surface is achieved by moving the reference surface and keeping the test surface fixed.

The estimates of the rotationally varying part of the measurement of the test surface and the rotationally varying part of the measurement of the reference surface are also determined. For example, determining the estimates of the rotationally varying part of the measurement of the test surface and the rotationally varying part of the measurement of the reference surface can include measuring the test surface of the test object with respect to a reference surface to generate a third relative surface measurement; and measuring the test surface with respect to the reference surface to generate a fourth relative surface measurement, where the test surface is in a rotated position with respect to the reference surface.

The combination is a linear combination.

The rotationally invariant part of the measurement of the test surface includes a mean radial profile of the test surface.

The combination includes a combination of elements of a difference array based on the first relative surface measurement, the second relative surface measurement, the estimate of the rotationally varying part of the measurement of the test surface, and the estimate of the rotationally varying part of the measurement of the reference surface.

The combination includes a combination of elements of a difference between an array representing a difference between the first relative surface measurement and the second relative surface measurement, and an array representing a difference between a shifted version of the estimate of the rotationally varying part of the measurement of the test surface and the estimate of the rotationally varying part of the measurement of the reference surface.

The combination includes $f=Ag$, where $f$ is a vector whose elements include values of the mean radial profile, $g$ is a vector whose elements include elements of a difference array $D(x,y)=M_2(x,y)-M_1(x,y)-[T_\theta(x-\Delta x, y-\Delta y)-T_\theta(x,y)]$, $T_\theta(x,y)$ is the estimate of the rotationally varying part of the measurement of the test surface, $R_\theta(x,y)$ is the estimate of the rotationally varying part of the measurement of the reference surface, $M_1(x,y)$ is the first relative surface measurement, $M_2(x,y)$ is the second relative surface measurement, $(\Delta x, \Delta y)$ are coordinates of the displacement between the first and second positions, and A is a matrix whose elements are calculated based on radial values $r=\sqrt{x^2+y^2}$, and $r'=\sqrt{(x-\Delta x)^2+(y-\Delta y)^2}$.

In some implementations, $A=\mathrm{inv}(H^T H)H^T$, where $\mathrm{inv}(H^T H)$ is an inverse or pseudo-inverse of $H^T H$ and H is a matrix, each row of which represents an equation that relates the vector f to an element of g.

At least some of the rows of H are determined based on interpolation among a plurality of elements of vector f.

A row is added to H to prevent H from being singular.

At least some of the plurality of radial values are selected to be more densely spaced than the size of a pixel with which the test surface was measured.

The plurality of radial values are selected to be more densely spaced as the radial values increase in magnitude.

In some implementations, measuring the test surface includes interferometrically measuring the test surface.

The estimate of the rotationally invariant part of the measurement of the test surface and the estimate of the rotationally variant part of the measurement of the test surface are combined to form a surface height map of the test surface.

The surface height map is expressed in Cartesian coordinates.

The surface height map is expressed in polar coordinates.

The estimate of a rotationally invariant part of the measurement of the reference surface is calculated at a plurality of radial values based on the estimate of the rotationally invariant part of the measurement of the test surface.

The estimate of the rotationally invariant part of the measurement of the reference surface is stored to increase the accuracy of subsequent measurements of other test surfaces with respect to the reference surface.

Implementations of the invention may include one or more of the following advantages.

The techniques allow for the separation of errors between test part and measurement instrument while suppressing drift errors that other techniques amplify. The techniques can be performed using only a single test part and single measurement instrument. The techniques can be used to measure flats, spheres, and aspheres. The techniques can obtain estimates of the rotationally invariant part of a surface measurement (e.g., mean radial profile) at a sampling density (resolution) greater than camera pixel density. Sub-pixel resolution is possible because the surface is sampled at many combinations of horizontal and vertical pixel locations whose radial distance is not at an integer multiple of the pixel distance.

The techniques can allow for a variety of ways to determine the rotationally varying part of the surface measurement.

Computation time and memory storage resources are within the capabilities of conventional computer systems, even for surfaces measured with high resolution.

For example, one aspect that can increase computational efficiency is representing the rotationally invariant surface in terms of the radial coordinate alone, dramatically reducing the number of unknowns that must be solved. For a sense of scale, given a 2000 by 2000 pixel detector area and data collected over an inscribed 1000 pixel radius circle, the matrix used in the system of equations would be about 3,140,000 rows (with one row per pixel in the circle) by 3,140,000 columns (with one column per pixel in the circle) if the desired rotationally invariant surface is calculated over a two-dimensional grid. However, the dimensions of the matrix are 3,140,000 rows by 1,000 columns if the rotationally invariant surface is calculated in terms of the radial coordinate alone at pixel resolution.

The matrix written in terms of the radial coordinate in some cases may still be too large to process in all but the largest computers. However if we make use of the normal equations and perform matrix multiplications using outer-products rather than inner-products as is usually done, the matrix that is solved is 1,000 rows by 1,000 columns and the peak memory usage is related to the small resultant matrix, not the large matrix, and the problem easily fits into memory. If sub-pixel resolution is employed, the final matrix may be as large as 5,000 rows by 5,000 columns which still may be solved on readily available but well equipped desktop computers.

Another aspect that increases computational efficiency is that each row of the large matrix, which is used to calculate the small matrix, is sparse in a way that makes it easy and fast to compute the resultant matrix. Typically, there are only four or perhaps six non-zero elements in each row of the large matrix and all of the multiplications and additions with zero elements can be skipped, which is the vast majority of operations.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION

Overview

Figure 1:
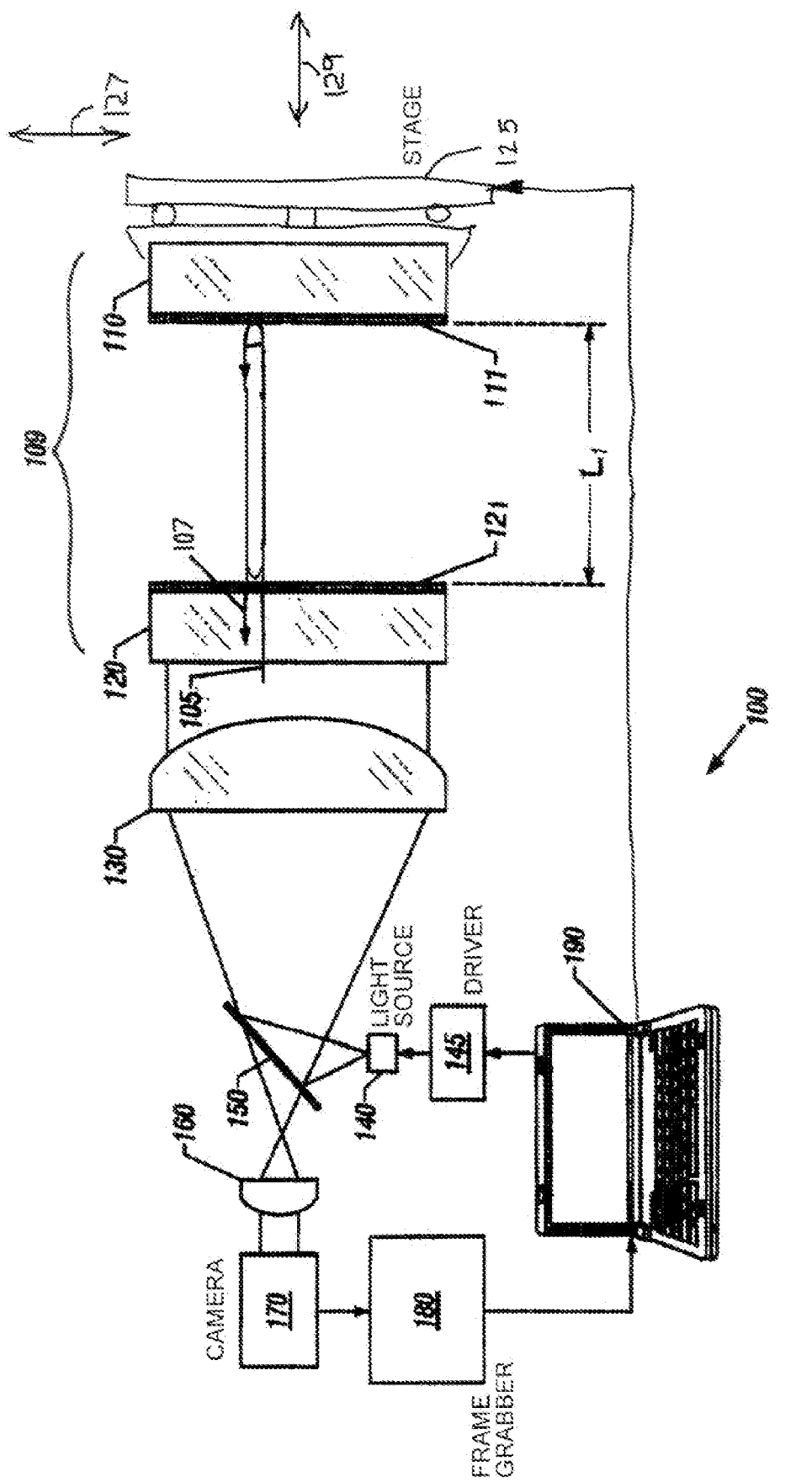
FIG. 1 is a schematic diagram of a surface form or wavefront measuring interferometry system.

One example of a system that can be used to measure the surface of a test part is a surface form (or wavefront) interferometry system 100 (FIG. 1) in which an interferometer (in this example, a Fizeau interferometer) is used to combine a test wavefront reflected from the test surface with a reference wavefront reflected from a reference surface to form an optical interference pattern or fringe pattern. (By "test surface" we mean to refer to the surface of the test part under inspection.) A fringe pattern is a contour map of the height difference between the test and reference surfaces, which is proportional to the phase difference of the light reflected by the reference surface and the light reflected by the test surface.

Phase-shifting interferometry (PSI) can be used to accurately determine the phase differences and the corresponding height map of the test surface. However, the test surface is measured relative to the reference surface, which may not be error free (e.g., flat) within the tolerances of the measurement. For many applications (e.g., certification of optical components, calibrating a transfer standard, etc.), one desires an "unbiased measurement" of the test surface, i.e., a surface height measurement that is independent of the reference surface used in the interferometric measurement (also called "absolute figure metrology"). The techniques described herein can be used to compensate for such reference surface errors to obtain an unbiased measurement of a test surface.

Some techniques for obtaining an unbiased measurement of the test surface include acquiring multiple measurements in which the position, orientation or both of the test surface is changed or "sheared" with respect to the reference surface from one measurement to the next. Since, as described above, lateral shearing methods for measuring a surface can be sensitive to drift, the system 100 is configured to perform both lateral shearing and rotational shearing of a test surface. The system 100 includes a computer 190 for controlling the interferometer and for processing data acquired from the lateral shearing and rotational shearing measurements to accurately and efficiently determine an estimate of a mean radial profile, as described in more detail below. The data processing performed by the computer 190 can alternatively be performed using data obtained from any measurement system or combination of measurement systems.

Phase Shifting Intedferometry Techniques

With PSI, the optical interference pattern is recorded at multiple spatial locations (or "pixels") of an image for each of multiple phase-shifts between the reference and test wavefronts to produce, for each pixel, a series of optical interference patterns that span, for example, at least a full cycle of optical interference (e.g., from constructive, to destructive, and back to constructive interference). The optical interference patterns define a series of irradiance values for each spatial location of the pattern, where each series of irradiance values has a sinusoidal dependence on the phase-shifts with a phase-offset equal to the phase difference between the combined test and reference wavefronts for that spatial location. Using numerical techniques known in the art, the phase-offset for each pixel is extracted from the sinusoidal dependence of the irradiance values to provide a measurement of the test surface relative the reference surface. Such numerical techniques are generally referred to as phase-shifting algorithms. A two-dimensional surface height measurement can then be derived from the phase-offset data.

The phase-shifts in PSI can be produced by changing the optical path length $L_1$ from the measurement surface to the interferometer relative to the optical path length from the reference surface to the interferometer. For example, in some systems the reference surface is moved relative to the measurement surface, and in other systems the measurement surface is moved relative to the reference surface. Alternatively, the phase-shifts can be introduced for a constant, non-zero optical path difference ($L_1$ not equal to zero) by changing the wavelength of source 140. The latter application is known as wavelength tuning PSI and is described, e.g., in U.S. Pat. No. 4,594,003 to G. E. Sommargren, the contents of which are incorporated herein by reference. A variety of other techniques for performing PSI can be used including, for example, Fourier Transform Phase Shifting Interferometry (FTPSI) as described in commonly owned U.S. Patent Application Publication No. US-2003-0160968-A1 entitled "PHASE SHIFTING INTERFEROMETRY METHOD AND SYSTEM" by Leslie Deck, the contents of which are incorporated herein by reference.

Surface Form Interferometry System

Referring to FIG. 1, surface form interferometry system 100 is adapted to measure the optical interference produced by reflections from a cavity 109 formed by a reference surface 121 of a reference optic 120 and a test surface 111 of a test object 110. The other surface of reference optic 120 is typically coated with an anti-reflection layer. Surface 121 is separated from surface 111 by a gap of distance $L_1$. System 100 includes an adjustable stage 125 under control of the computer 190 for positioning test object 110 relative to reference optic 120. By controlling the stage 125, the computer 190 is able to rotate the test object 110 about one or more axes and is able to translate the test object 110 in any direction. For example, computer 190 controls the stage 125 to laterally shear the test surface 111 along axis 127 to generate a lateral shear in the image of the test surface 111 at a camera 170. To generate rotational shear, the computer 190 controls the stage 125 to rotate the surface 111 about axis 129. The stage 125 can also be used to vary the distance $L_1$ for PSI based on optical path length tuning. Alternatively, a separate stage can be used for varying the distance $L_1$.

Depending on the optical imaging properties of the system 100 and the shape of the test surface 111, various combinations of rotation and translation of the test object 110 relative to the reference optic 120 (while keeping the distance $L_1$ constant) can yield an effective lateral shear between acquired surface images (i.e., a translation of one image with respect to the other), or an effective rotational shear between acquired surface images (i.e., a rotation of one image with respect to the other), or both rotational and lateral shear. For example, to generate a lateral shear in the image of the surface of a spherical test object, the stage 125 rotates the spherical test object about its center. Alternatively, the system can keep the test object 110 fixed and position the reference optic 120 relative to the test object 110 to provide lateral shear, rotational shear, or both.

System 100 additionally includes a tunable light source 140 (e.g., a laser diode), a driver 145 connected to light source 140 for adjusting the optical frequency of its output, a beam splitter 150, a collimating optic 130, an imaging optic 160, a camera 170 (e.g., a CCD camera), and a frame grabber 180 for storing images detected by camera 170. In some embodiments, a single device can perform both control and measurement functions (e.g., frame grabber 180 may be incorporated in computer 190). Driver 145 tunes the optical frequency $\nu$ of light source 140, through a frequency range $\Delta \nu$ about a nominal optical frequency of $\nu_0$.

During operation, computer 190 causes driver 145 to control the optical frequency of light emitted by light source 140 and causes frame grabber 180 to store an image of the optical interference detected by camera 170 for each of the specified optical frequencies. Frame grabber 180 sends each of the images to computer 190, which analyzes them. In some embodiments, driver 145 linearly modulates the optical frequency of the light source 140 as the series of interference images are being recorded. Alternatively, in other implementations, the driver 145 can modulate the optical frequency in discrete steps or according to other functions.

During operation, light source 140 directs light having an optical frequency $\nu$ to beam splitter 150, which then directs the light to collimating lens 130 to collimate the light into a beam having a near planar wavefront. The incoming beam 105 undergoes multiple reflections between surface 121 and surface 111 of cavity 109. The return beam 107 has a wavefront shape that carries information about the optical path length. Lenses 130 and 160 image the return beam 107 onto camera 170 to form an optical interference pattern that contains information about an optical phase $\phi$, which is proportional to the distance $L_1$ (and therefore represents the shape of the test surface 111 relative to the reference surface 121). Any of a variety of techniques can be used to extract the phase $\phi$, for each pixel to yield a phase distribution $\phi(x,y)$ (i.e., phase map) for the cavity. The result of the phase extraction generates phases modulo $2\pi$. These phase ambiguities can be accounted for in the phase map using conventional $2\pi$ phase ambiguity unwrapping techniques, commonly known in the art. From the phase map, the computer 190 generates a surface measurement $S(x,y)$.

Data Processing

In this example, in which the surface measurement $S(x,y)$ is acquired on the discrete two-dimensional grid of a CCD camera, the function $S(x,y)$ consists of a set of samples of a continuous function $\tilde{S}(x,y)$ that represents the height of the test surface relative to the height of the reference surface. While the function $\tilde{S}(x,y)$ is defined for continuous values of x and y over the extent of the test surface, the function $S(x,y)$ is defined at a set of discrete locations represented by x and y coordinates corresponding to (e.g., the centroid of) an area that gets imaged onto a pixel in the plane of the camera 170. A mapping function (e.g., stored in the memory of computer 190) provides the correspondence between a particular pixel address in memory and the x,y coordinates for the surface measurement recorded at that pixel. This mapping is able to account for the effects of distortion in the imaging optics from the test surface to the camera 170.

Figure 2A:
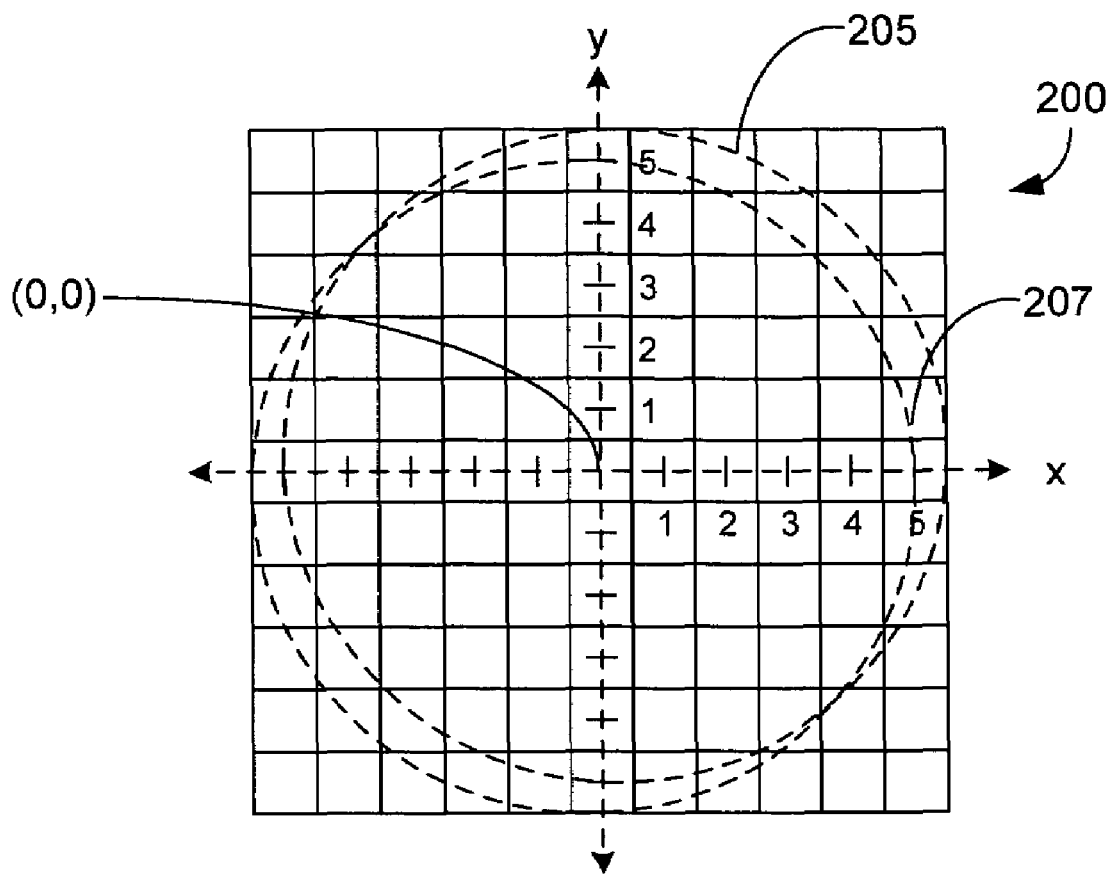
FIGS. 2A–2C are diagrams of coordinate systems based on pixel locations for measured surface data.

A typical camera may have millions of pixels, however, for simplified illustration, FIG. 2A shows an 11×11 array of 121 pixels. The value of the surface measurement $z=S(x,y)$ describing the distance z between the test surface and the reference surface is based on the total irradiance of a portion of an interference pattern causing charge to build up in a pixel of the CCD camera. For the purposes of this example, the discrete locations in the surface measurement $S(x,y)$ measured by the camera pixels will correspond to integral values of x and y.

It is also possible to represent the surface measurement S as a function of polar coordinates:

$$z=S(x,y)=S(r,\theta),$$

where r is the radial distance from the origin (0,0) and $\theta$ the angle from the +x axis of a point (a pixel center) on the x-y plane. Strictly speaking the two forms of S are different in their algebraic representation; however, since they describe the same surface we keep the same symbol S in the two cases and the coordinate system and representation referenced is implied by the names of the independent variables.

Furthermore, we note that it is possible to represent $$S(r,\theta)=S_\theta(r,\theta)+S_r(r),$$

where $$S_r(r) = \frac{1}{2\pi}\int_0^{2\pi} S(r,\theta)\,d\theta,$$

and $$S_\theta(r,\theta)=S(r,\theta)-S_r(r).$$

A function $S(r,\theta)$ is the sum of $S_\theta(r,\theta)$, which is referred to as the angularly dependent or rotationally varying (RV) component of the surface measurement S and $S_r(r)$ which is the mean radial profile, angularly independent or rotationally invariant (RI) component of the surface measurement S. As described above, for many applications one desires an absolute measurement of the test surface unbiased by the reference surface. However, the surface measurement actually represents the difference between the test surface and reference surface. The x and y coordinates of the pixel centers can be thought of as indices into arrays. We can describe a relative surface measurement M as the difference between the height of a test surface (T) and the height of a reference surface (R):

$$M(r,\theta)=T(r,\theta)-R(r,\theta).$$

There are methods for obtaining T, unbiased by R, by using only lateral shear (see, e.g., Clemens Elster, "Exact two-dimensional wave-front reconstruction from lateral shearing interferograms with large shears," *Applied Oiptics*, 39, No. 29, (2000) pp. 5353–5359); however using only lateral shear to separate T and R can result in the amplification of errors due to drift in the test setup. One approach to solving for T unbiased by R is to write a set of equations relating all of the data to a desired surface characteristic and to perform a least-squares solution using a pseudo-inverse technique. The system of equations generated results in a matrix whose number of rows and number of columns are equal to the number of pixels in the measurement. Typically, because of the memory constraints, this approach can only use a limited number of pixels in the calculation due to the size of the resulting matrix.

It is already known that rotational shear may be used to robustly determine the RV component of T, unbiased by R (see, e.g., Michael Küchel, "A new approach to solve the three flat problem," *Optik*, 112, No 9 (2001) pp. 381–91). The techniques described herein can be used to robustly determine the RI component of T (the mean radial profile) unbiased by R, without amplification of errors due to drift in the test setup, and using a large number of pixels (or even calculating the mean radial profile with sub-pixel resolution) without demanding excessive memory resources. The RV component of T and the RI component of T can then be combined to form a surface height map of the test surface, unbiased by the reference surface.

Figure 3:
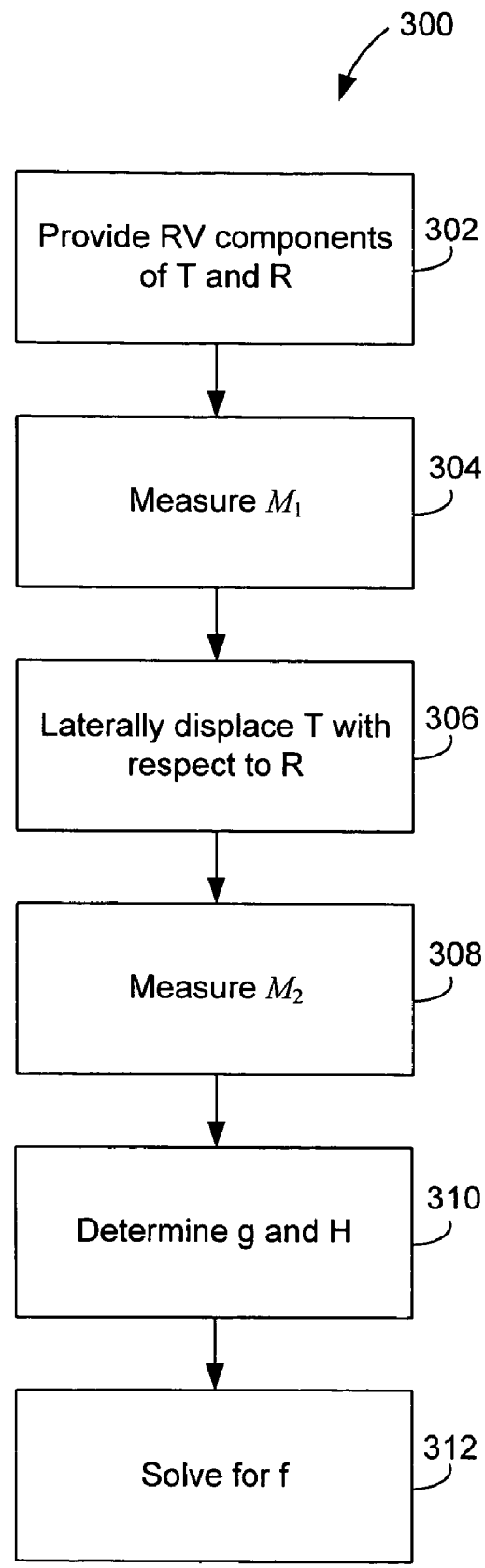
FIG. 3 is a flowchart of a surface measurement process.

Referring to FIG. 3, a flowchart for a surface measurement process 300 includes steps performed by computer 190 to process data obtained by the system 100 (or by any other suitable system) to generate the mean radial profile of the test surface T unbiased by the reference surface R.

Estimates of $T_\theta(x,y)$ and $R_\theta(x,y)$, the RV components of T and R, are determined through any of a variety of known techniques including, for example, using the system 100 to perform the rotational shearing measurements. The resulting RV components of T and R are provided to (302) (i.e. stored in) computer 190. The system 100 measures (304) surface T with respect to reference surface R to produce a measurement array $M_1$, representing a relative surface measurement. Computer 190 then controls the stage 125 to move the test object 110 relative to the reference optic 120 to laterally displace (306) test surface T relative to reference surface R (by an amount that is known or otherwise determined) in the image (pixel) coordinate system of the camera 170. The system 100 then performs (308) the resulting laterally sheared measurement of T with respect to R to produce a measurement array $M_2$.

The following data has been acquired and stored in the computer 190 in the discretely sampled x-y coordinate system:

$T_\theta(x,y),$ $R_\theta(x,y),$ $M_1(x,y)=T(x,y)-R(x,y)$, and $M_2(x,y)=T(x-\Delta x,y-\Delta y)-R(x,y).$ The lateral shear vector between the two measurement positions is $(\Delta x, \Delta y)$, corresponding to a lateral shear distance of $\sqrt{\Delta x^2 + \Delta y^2}$.

Even though the data in this example includes a measurement array $M_2$ that represents the test surface T sheared with respect to its position in measurement array $M_1$, it is possible to use data from a relative surface measurement in which the reference surface R has been sheared with respect to its position in measurement array $M_1$:

$\tilde{M}_2(x,y)=T(x,y)-R(x+\Delta x,y+\Delta y)$ and shift the data such that $M_2(x,y)=\tilde{M}_2(x-\Delta x,y-\Delta y).$ It is also possible to determine the mean radial profile of the reference surface R by subtracting the determined mean radial profile of the test surface T from a mean radial profile obtained from the measurement array $M_1$. Such a measurement of the mean radial profile of the reference surface R can be stored in the computer 190 as a calibration of the reference surface for later use by the system 100, for example, to increase the accuracy of measurements of other test objects without having to recalibrate the reference surface.

From this data, a difference array D is calculated:

$D(x,y)=M_2(x,y)-M_1(x,y)-[T_\theta(x-\Delta x,y-\Delta y)-T_\theta(x,y)].$

Simplifying yields $D(x,y)=T_r(x-\Delta x,y-\Delta y)-T_r(x,y)=T_r(r')-T_r(r),$ where $r=\sqrt{x^2+y^2},$ and $r'=\sqrt{(x-\Delta x)^2+(y-\Delta y)^2}.$ Also $T_r$ having two independent variables is assumed to be expressed in x-y coordinates, while $T_r$ having only one independent variables is assumed to expressed in radial coordinate r (which is appropriate since $T_r$ is independent of $\theta$).

To form the difference array D, the values of $T_\theta(x,y)$, $R_\theta(x,y)$, $M_1(x,y)$, and $M_2(x,y)$ are interpolated if necessary when respective pixel coordinates x,y are not aligned. For example, this can occur when: lateral shear distance is not a multiple of the pixel size, the imaging optics of system 100 has distortion (e.g., the pixels in the image plane of the camera are regularly spaced, but the corresponding locations on the test surface are not regularly spaced), or when testing non-flat components and lateral shear is accomplished by a rotation of the test part about an axis other than the optical axis of the measurement system.

Each element of the array D represents the difference in height between two points in the function $T_r(r)$, which is the mean radial profile that we desire. We can rewrite the equation defining D as a linear system of equations:

g=Hf, where g is a column vector made up of the elements of D where there is valid data (i.e. where the regions of valid data in $T_\theta(x,y)$, $R_\theta(x,y)$, $M_1(x,y)$, and $M_2(x,y)$ overlap), f is an (unknown) vector whose elements represent samples of the desired mean radial profile $T_r(r)$, and H is a matrix to be calculated as described below, each row of which is an equation that relates the mean radial profile $T_r(r)$ to an element of g. The computer 190 determines (310) the elements of g and H solves (312) this linear system of equations to determine the desired mean radial profile f.

In general terms, each element of g is the difference between two points in the function of $T_r(r)$. The elements of g can be indexed in terms of an integral index i, as g(i), mapped to D(x,y) in any order as long as a particular value of i corresponds to a particular pair of (x,y) coordinates and a particular pair of (r,θ) coordinates. (Since r' depends on the value of θ, g is not independent of θ.)

For example, if the lateral shear vector is $(\Delta x, \Delta y)=(2,0)$ in units of pixels, and if i=1 corresponds to (x,y)=(0,0) we have $$g(1)=D(0,0)=T_r(-2,0)-T_r(0,0)=T_r(2)-T_r(0),$$

and the corresponding row of H whose inner product with the vector f (j) yields g(1) would be $$H(1,:)=\{-1,0,1,0,\ldots\}.$$

Figure 2B:
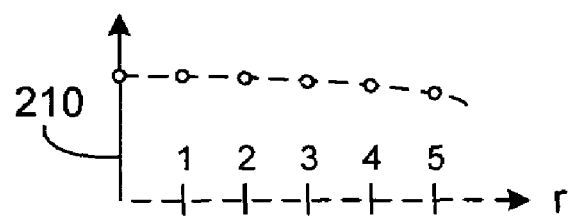

The colon is used to indicate all column indices yielding all of the elements of the indexed row and the ellipsis to indicate that all remaining elements are 0. In the preceding example, the mean radial profile f(j) has a uniform resolution of 1 pixel (i.e., with successively indexed values of the mean radial profile separated by a distance in r of 1 pixel). In particular, the elements of f(j) are indexed such that f(1) corresponds to $T_r(0)$, f(2) corresponds to $T_r(1)$, f(3) corresponds to $T_r(2)$, and likewise for higher values of i. FIG. 2B shows an exemplary plot of samples of the mean radial profile for a surface with a convex shape at a uniform pixel resolution of 1 pixel.

The number of rows of H corresponds to the number of elements in g(i), which typically corresponds to a subset of the pixels in the camera 170 such as the number of valid elements of D(x,y) whose x-y coordinates fall within the intersection of a first a circle 205 within the pixel array of the camera 170 (e.g., a circle capturing most of a circular field of view defined by the imaging optics of system 100) representing valid data in measurement array $M_1$ and a second circle 207 representing valid data in the laterally sheared measurement array $M_2$. The number of valid elements of D(x,y) may be less than the number of pixels in the intersection of the valid data circles for other reasons (e.g., bad pixels). The number of columns of H corresponds to the number of samples in the mean radial profile f(j) that are desired.

The matrix H defined in this manner will be singular because the average value (or equivalently any particular value on the vertical axis 210 such the origin) of the mean radial profile is undefined. This can be explained, for example, by noting the measured data is related to the mean radial profile by subtracting selected values of the mean radial profile from other values of the mean radial profile, and the average value of the mean radial profile is lost in the result. This problem can be solved by adding one equation (one row) that sets the average of the mean radial profile to zero, although one may specify any similar constraint such as setting the value at the origin to zero. For example, the vector g(i) is appended with a single element whose value is 0 and the matrix H has one row appended with all entries equal to one.

Because the difference array D (and therefore g(i)) is calculated from data sampled on a square grid in Cartesian coordinates, but the parameter of interest r for calculating the mean radial profile f(j) is the Euclidean distance, the mean radial profile is calculated at many positions which may have integral (pixel length) r values, few of which have integral x and y values. As a result, each row of H will need to interpolate between the available sample points represented in g(i) to relate the elements in f(j) to these interpolated sample points at non-integral values of x and y corresponding to locations at which the mean radial profile f(j) is being determined.

For example, if i=2 corresponds to (x,y)=(0,1) then $$g(2)=D(0,1)=T_r(-2,1)-T_r(0,1)=T_r(\sqrt{5})-T_r(1),$$

and the corresponding row of H would be $$H(2,:)=\{0,-1,0.764,0.236,0,\ldots\}$$

using $1^{st}$ order (linear) interpolation.

It is possible to use $0^{th}$ (nearest neighbor), $1^{st}$ (linear) or higher order interpolations in the construction of the matrix H. In preferred embodiments, at least linear interpolation or higher order interpolation is used. Additionally, the lateral shear distance may not be an integral multiple of the pixel width, resulting in interpolation being used to calculate the elements of g.

Figure 2C:
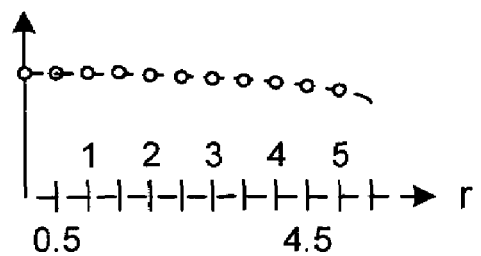

Successively indexed values of the mean radial profile f(j) can be separated by a distance in r of less than one pixel for "sub-pixel resolution," as shown in FIG. 2C. Since there is an increasing density of unique values of the Euclidean distance r for any pixel as distance from the origin increases, sub-pixel interpolation is likely to be more accurate for pixels away from the origin. For example, there is one pixel at r=0, four at r=1, four more at r=1.414, and increasingly more pixels at more densely spaced values of r. Additionally, successively indexed values of the mean radial profile f(j) do not need to be uniformly spaced. Thus, some implementations generate values of f(j) and therefore $T_r(r)$ with increasing resolution as r increases.

The "radial shear distance" r'−r varies between the lateral shear distance $\sqrt{\Delta x^2+\Delta y^2}$ for samples whose direction θ is parallel to the shear direction (the direction of the shear vector), and zero for samples whose direction θ is orthogonal to the shear direction. Therefore elements of D(x,y) whose (x,y) coordinates are on the perpendicular bisector of the initial and laterally sheared positions of the origin (0,0) will result in a row of H, that is all zero resulting in a singular matrix. Additionally, elements of D(x,y) near the perpendicular bisector will have radial shear distances near zero and will be subject to noise and also should not be included. For example, the element at (x,y)=(1,0) from the example above would corresponds to:

$$D(1,0)=T_r(-1,0)-T_r(1,0)=T_r(1)-T_r(1).$$

The mean radial profile $T_r(r)$ is represented within the data of g(i) at increasing sampling density as r increases in the two-dimensional plane. Some care must be exercised in sub-pixel resolution sampling of the mean radial profile since near the origin there are few measurements while near the periphery of the aperture the sampling is exceedingly dense. If the locations at which f is to be determined are too finely specified then the matrix H will again be singular. To avoid producing a singular matrix one needs to ensure that there are samples of the mean radial profile represented within the data of g(i) between the locations at which one desires to determine the mean radial profile. One example of a sequence of locations in r, in pixel units, at which the mean radial profile may be determined is: 0, 1, 1.5, 2, 2.5, 3, 3.5, 4, 4.5, 5, 5.25, 5.5, 5.75, 6, . . . aperture radius in pixels. When solving the equation g=Hf, it becomes clear that depending upon the size of the arrays M and D that the matrix H can be quite large. The arrays M and D typically have approximately one element per camera pixel over a typically square area. The vector g typically has approximately one element of valid data per pixel within a (typically circular) imaging aperture inscribed within a (typically square) camera area. The camera area may range from approximately 32×32 pixels to 2048×2048 pixels or more. For a 2048×2048 detector this corresponds to a vector g that has approximately three million elements. The vector f (and the mean radial profile $T_r(r)$) will, however, only need approximately one element per pixel (for 1 pixel resolution) along a radius of the circular aperture or approximately 1000 elements for a 2048×2048 element detector. Additionally, the matrix H is quite sparse. In the case of linear interpolation most rows of H will have only four non-zero elements out of the 1000 elements in a row in this example. One approach to solving the linear matrix equation is to solve the equivalent problem $H^T g = H^T H f$.

In this example, the product $H^T g$ has about 1000 elements and $H^T H$ is a square matrix of about 1000 elements on a side. This sized problem is readily solved by software packages such as Matlab by The MathWorks on a typical Windows based computer.

To successfully solve this problem in a short amount of time, one should efficiently calculate $H^T g$ and $H^T H$ because the matrix H is quite large. In one approach, these products can be calculated as an inner-product (dot-product) of columns of H with all other columns of H or g. However, H can be too large too store in computer memory. Additionally, it is rather expensive in computation time to determine all of the elements of a column of H and the columns need to be calculated many times. Thus, this approach for computing the products an element at a time is not efficient.

Another more efficient approach to calculating $H^T H$ is to determine a row of H, which is easy to do, and make full use of it and repeat for each row. It turns out that the product $H^T H$ can be expressed as a sum of all outer-products of each row of H with itself. Furthermore, each row of H is so sparse that one only needs to compute the non-zero products and sum them into the product array. A similar operation can be performed in the computation of $H^T g$. This approach makes it possible to produce a system of equations whose solution is the mean radial profile and that make use of all the data present and still fits in the memory constraints of a standard Microsoft Windows based computer.

It is also important to realize that in many applications one may be interested in much more modest resolution requirements. In these cases it is possible to forgo these memory conservation techniques and directly solve g=Hf. For example, if the data fits in a circle with a radius of 100 pixels, then H is approximately 31,000 by 100 elements and takes about 24 Megabytes of computer storage, which fits within the memory of most current Windows based computers.

It is appropriate to use a large lateral shear distance to improve the signal-to-noise ratio of the measurement process. This is motivated by the simple observation that one is measuring height change over a distance and the signal is greater for a fixed slope if the lateral shear distance is larger. If one proceeds directly to solve the equation g=Hf, it turns out that elements of D (equivalently g) for which the radial shear distance is zero are included in the computations.

As described above, a radial shear distance of zero means that the two points that are entering the difference equation are the same distance from the origin. These measurements can be excluded from the computation by simply leaving out an element of g and corresponding row of H. All elements in D that are on a line perpendicular to the shear direction and through the midpoint between the origin of the mean radial profile in the original and sheared locations have a radial shear distance of zero. Elements of D that correspond to very small radial shear distance are likely to be noisy and can also be excluded from the computation of $H^T g$ and $H^T H$ or left out of the equation g=Hf.

It is also possible to combine sets of equations for multiple lateral shears, where some rows of H use one lateral shear vector, and other rows H use a different lateral shear vector. It is important to realize that the motion producing the shear may be in any direction. Alternatively, rather than combining multiple shear data sets into one set of equations, one may use each shear data set to calculate an estimate of the mean radial profile and then average all of the mean radial profile estimates to form an improved estimate of the mean radial profile.

There are a variety of algorithms for solving a system of linear equations. One reasonable choice is to calculate the singular value decomposition (SVD) of $H^T H = U S W^T$ (see, e.g., Roger Horn and Charles Johnson, "Matrix Analysis", Cambridge University Press, 1985) where U and W are unitary matrices and S is a diagonal matrix of singular values. This allows one to both identify and resolve a rank deficiency of the matrix via the pseudo-inverse $(H^T H)^\dagger$ rather than a strict inverse. The SVD also provides a means for determining if the sample locations are causing a rank deficiency. The method is sufficiently robust that it is possible to determine the mean radial profile reliably if there are a few excess sample locations or if the equation defining the average value of the mean radial profile is left out. In general, it is preferable to resolve these sources of rank deficiency in the definition of the system of equations when possible rather than in the solution method. Methods to determine the SVD of a matrix are well documented. It should be noted that the matrix $H^T H$ is real and symmetric and therefore the SVD takes a simpler form $H^T H = U S U^T$ [Horn & Johnson, pg. 157g] and the columns of U are both the eigenvectors and singular vectors of $H^T H$. Calculating the SVD of a real symmetric matrix by obtaining the eigenvalues and eigenvectors uses less memory than a general SVD code.

The desired solution is the mean radial profile f $(H^T H)^\dagger H^T g = (H^T H)^\dagger H^T H f = f$.

If one knows the shear displacements and coordinates of the data before the data are taken one may compute the pseudo-inverse $(H^T H)^\dagger$ in advance and if H is small enough the matrix $A = (H^T H)^\dagger H^T$ may be computed in advance. If this is the case, then the solution requires collection of the data and a single matrix multiplication $$f = Ag.$$

In some cases H may be to be too large to conveniently store in its full representation. Even though H is very sparse the product $A=(H^TH)^\dagger H^T$ is not necessarily sparse. As a result, when H is large the solution will involve two matrix multiplications, the first between a sparse matrix H stored in a computationally efficient manner and a data vector g $$g' = H^T g;$$

where g' is a relatively modest length vector, perhaps 1000 elements long. The final result is then computed by $$f = (H^TH)^\dagger g'.$$

There is a significant computational advantage to a test setup that precisely repeats the position of the test part so that the pseudo-inverse of the matrix can be computed in advance. However, if need be one may compute the matrix uniquely for each set of data processed so that it is not a requirement to have repeatable positioning from measurement to measurement, rather it is only necessary to know the lateral shear vector adequately for any given measurement.

Automation, Image Processing, and Software

In preferred embodiments, the computer controls the stage(s) supporting the test and or reference objects to automatically position them for each of the different measurements. To facilitate precisely positioning by the stages, the test and/or reference objects can include one or more alignment marks within the field of view of the camera. Image processing techniques can then be used to determine the precise motion imparted to the objects by the stage(s) based on the change in position of the various alignment marks as seen by the camera.

In any of the embodiments described above, the computer can include hardware, software, or a combination of both to control the other components of the system and to analyze the surface measurements to extract the desired information about the test surface and/or reference surface. The analysis described above can be implemented in computer programs using standard programming techniques. Such programs are designed to execute on programmable computers each comprising a processor, a data storage system (including memory and/or storage elements), at least one input device, at least one output device, such as a display or printer. The program code is applied to input data (e.g., phase-shifted images from a CCD camera) to perform the functions described herein and generate information (e.g., the topography of a selected surface), which is applied to one or more output devices. Each computer program can be implemented in a high-level procedural or object-oriented programming language, or an assembly or machine language. Each such computer program can be stored on a computer readable storage medium (e.g., CD ROM or magnetic diskette) that when read by a computer can cause the processor in the computer to perform the analysis described herein.

A number of embodiments of the invention have been described. Nevertheless, it will be understood that various modifications may be made without departing from the spirit and scope of the invention.

What is claimed is:

1. A method comprising:
    measuring a test surface of a test object with respect to a reference surface to generate a first relative surface measurement, where the test surface is in a first position relative to the reference surface;
    measuring the test surface with respect to the reference surface to generate a second relative surface measurement, where the test surface is in a second position relative to the reference surface different from the first position;
    providing an estimate of a rotationally varying part of a measurement of the test surface and an estimate of a rotationally varying part of a measurement of the reference surface;
    calculating an estimate of a rotationally invariant part of the measurement of the test surface at a plurality of radial values based on a combination of the first relative surface measurement, the second relative surface measurement, the estimate of the rotationally varying part of the measurement of the test surface, the estimate of the rotationally varying part of the measurement of the reference surface, and a quantity representing the change between the first and second relative positions; and
    outputting the estimate of the rotationally invariant part of the measurement of the test surface.

2. The method of claim 1, wherein the second position comprises a laterally displaced position of the test surface with respect to the reference surface.

3. The method of claim 1, wherein the second position of the test surface relative to the reference surface is achieved by moving the test surface and keeping the reference surface fixed.

4. The method of claim 1, wherein the second position of the test surface relative to the reference surface is achieved by the reference surface and keeping the test surface fixed.

5. The method of claim 1, further comprising determining the estimate of the rotationally varying part of the measurement of the test surface and the estimate of the rotationally varying part of the measurement of the reference surface.

6. The method of claim 5, wherein determining the estimate of the rotationally varying part of the measurement of the test surface comprises:
    measuring the test surface with respect to the reference surface used in the first relative surface measurement or with respect to a different reference surface to generate a third relative surface measurement; and
    measuring the test surface with respect to the reference surface used in third relative surface measurement to generate a fourth relative surface measurement, where the test surface is in a rotated position relative to its position in the third relative surface measurement.

7. The method of claim 1, wherein the combination is a linear combination.

8. The method of claim 1, wherein the rotationally invariant part of the measurement of the test surface comprises a mean radial profile of the test surface.

9. The method of claim 8, wherein the combination comprises a combination of elements of a difference array based on the first relative surface measurement, the second relative surface measurement, the estimate of the rotationally varying part of the measurement of the test surface, and the estimate of the rotationally varying part of the measurement of the reference surface.

10. The method of claim 9, wherein the combination comprises a combination of elements of a difference between an array representing a difference between the first relative surface measurement and the second relative surface measurement, and an array representing a difference between a shifted version of the estimate of the rotationally varying part of the measurement of the test surface and the estimate of the rotationally varying part of the measurement of the reference surface.

11. The method of claim 10, wherein the combination comprises f=Ag, where f is a vector whose elements include values of the mean radial profile, g is a vector whose elements include elements of a difference array $D(x,y)=M_2(x,y)-M_1(x,y)-[T_\theta(x-\Delta x, y-\Delta y)-T_\theta(x,y)]$, $T_\theta(x,y)$ is the estimate of the rotationally varying part of the measurement of the test surface, $R_\theta(x,y)$ is the estimate of the rotationally varying part of the measurement of the reference surface, $M_1(x,y)$ is the first relative surface measurement, $M_2(x,y)$ is the second relative surface measurement, $(\Delta x, \Delta y)$ are coordinates of the displacement between the first and second positions, and A is a matrix whose elements are calculated based on radial values $r=\sqrt{x^2+y^2}$, and $r'=\sqrt{(x-\Delta x)^2+(y-\Delta y)^2}$.

12. The method of claim 11, wherein $A=\text{inv}(H^TH)H^T$, where $\text{inv}(H^TH)$ is an inverse or pseudo-inverse of $H^TH$ and H is a matrix, each row of which represents an equation that relates the vector f to an element of g.

13. The method of claim 12, wherein at least some of the rows of H are determined based on interpolation among a plurality of elements of vector f.

14. The method of claim 12, further comprising adding a row to H to prevent H from being singular.

15. The method of claim 1, wherein at least some of the plurality of radial values are selected to be more densely spaced than the size of a pixel with which the test surface was measured.

16. The method of claim 1, wherein the plurality of radial values are selected to be more densely spaced as the radial values increase in magnitude.

17. The method of claim 1, wherein measuring the test surface comprises interferometrically measuring the test surface.

18. The method of claim 1, further comprising combining the estimate of the rotationally invariant part of the measurement of the test surface and the estimate of the rotationally variant part of the measurement of the test surface to form a surface height map of the test surface.

19. The method of claim 18, wherein the surface height map is expressed in Cartesian coordinates.

20. The method of claim 18, wherein the surface height map is expressed in polar coordinates.

21. The method of claim 1, further comprising calculating an estimate of a rotationally invariant part of the measurement of the reference surface at a plurality of radial values based on the estimate of the rotationally invariant part of the measurement of the test surface.

22. The method of claim 21, further comprising storing the estimate of the rotationally invariant part of the measurement of the reference surface to increase the accuracy of subsequent measurements of other test surfaces with respect to the reference surface.

23. The method of claim 22, wherein increasing the accuracy of subsequent measurements of other test surfaces with respect to the reference surface comprises reducing uncertainty in an estimate of a rotationally invariant part of a subsequent measurement.

24. The method of claim 1, wherein outputting the estimate of the rotationally invariant part of the measurement of the test surface comprises storing the estimate of the rotationally invariant part of the measurement of the test surface.

25. The method of claim 1, wherein outputting the estimate of the rotationally invariant part of the measurement of the test surface comprises displaying the estimate of the rotationally invariant part of the measurement of the test surface.

26. A computer readable medium comprising a program that causes a processor to:
   receive a first relative surface measurement of a test surface of a test object with respect to a reference surface, where the test surface is in a first position relative to the reference surface;
   receive a second relative surface measurement of the test surface with respect to the reference surface, where the test surface is in a second position relative to the reference surface different from the first position;
   receive an estimate of a rotationally varying part of a measurement of the test surface and an estimate of a rotationally varying part of a measurement of the reference surface;
   calculate an estimate of a rotationally invariant part of the measurement of the test surface at a plurality of radial values based on a combination of the first relative surface measurement, the second relative surface measurement, the estimate of the rotationally varying part of the measurement of the test surface, the estimate of the rotationally varying part of the measurement of the reference surface, and a quantity representing the change between the first and second relative positions; and
   output the estimate of the rotationally invariant part of the measurement of the test surface.

27. The computer readable medium of claim 26, wherein the second position comprises a laterally displaced position of the test surface with respect to the reference surface.

28. The computer readable medium of claim 26, wherein the second position of the test surface relative to the reference surface is achieved by moving the test surface and keeping the reference surface fixed.

29. The computer readable medium of claim 26, wherein the second position of the test surface relative to the reference surface is achieved by moving the reference surface and keeping the test surface fixed.

30. The computer readable medium of claim 26, wherein outputting the estimate of the rotationally invariant part of the measurement of the test surface comprises storing the estimate of the rotationally invariant part of the measurement of the test surface.

31. The computer readable medium of claim 26, wherein outputting the estimate of the rotationally invariant part of the measurement of the test surface comprises displaying the estimate of the rotationally invariant part of the measurement of the test surface.

32. An apparatus comprising:
   an interferometer configured to measure a test surface of a test object with respect to a reference surface to generate a first relative surface measurement, where the interferometer includes a stage to position the test surface is in a first position relative to the reference surface; and
      measure the test surface with respect to the reference surface to generate a second relative surface measurement in which the stage is configured to position the test surface in a second position relative to the reference surface different from the first position; and
   an electronic processor configured to receive the first relative surface measurement and the second relative surface measurement;

receive an estimate of a rotationally varying part of a measurement of the test surface and an estimate of a rotationally varying part of a measurement of the reference surface; and calculate an estimate of a rotationally invariant part of the measurement of the test surface at a plurality of radial values based on a combination of the first relative surface measurement, the second relative surface measurement, the estimate of the rotationally varying part of the measurement of the test surface, the estimate of the rotationally varying part of the measurement of the reference surface, and a quantity representing the change between the first and second relative positions.

33. The apparatus of claim 32, wherein the second position comprises a laterally displaced position of the test surface with respect to the reference surface.

34. The apparatus of claim 32, wherein the stage is configured to position the test surface in a second position relative to the reference surface by moving the test surface and keeping the reference surface fixed.

35. The apparatus of claim 32, wherein the stage is configured to position the test surface in a second position relative to the reference surface by moving the reference surface and keeping the test surface fixed.

* * * * *